(12) United States Patent
Croisonnier

(10) Patent No.: US 10,528,153 B2
(45) Date of Patent: *Jan. 7, 2020

(54) KEYBOARD WITH TOUCH SENSITIVE ELEMENT

(71) Applicant: Logitech Europe S.A., Lausanne (CH)

(72) Inventor: Regis Croisonnier, Bellevue (FR)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,699

(22) Filed: Feb. 3, 2017

(65) Prior Publication Data

US 2017/0147085 A1 May 25, 2017

Related U.S. Application Data

(63) Continuation of application No. 14/557,345, filed on Dec. 1, 2014, now Pat. No. 9,612,664.

(51) Int. Cl.
*G06F 3/01* (2006.01)
*G06F 3/02* (2006.01)
(Continued)

(52) U.S. Cl.
CPC ............ *G06F 3/0219* (2013.01); *G06F 3/017* (2013.01); *G06F 3/021* (2013.01); *G06F 3/0233* (2013.01); *G06F 3/0238* (2013.01); *G06F 3/0338* (2013.01)

(58) Field of Classification Search
CPC ...... G06F 3/0213; G06F 3/0488; H01H 13/70
(Continued)

(56) References Cited

U.S. PATENT DOCUMENTS

| 5,736,976 A * | 4/1998 | Cheung ................. G06F 3/0219 341/22 |
| 7,023,426 B1 * | 4/2006 | Robinson .............. G06F 3/0202 345/168 |

(Continued)

FOREIGN PATENT DOCUMENTS

| CN | 1758190 | 4/2006 |
| CN | 105653049 | 6/2016 |
| CN | 205485930 | 8/2016 |

OTHER PUBLICATIONS

U.S. Appl. No. 14/557,345 , "Final Office Action", dated Jun. 9, 2016, 27 pages.

(Continued)

*Primary Examiner* — Prabodh M Dharia
(74) *Attorney, Agent, or Firm* — Kilpatrick Townsend & Stockton LLP

(57) ABSTRACT

Some embodiments include an input device comprising a processor and a key frame having a plurality of keys disposed therein and a motion sensor controlled by the processor and disposed below the key frame. The plurality of keys includes a controller key and one or more input keys, where the motion sensor generates a signal corresponding to a movement of an object along the surface of the one or more input keys when the controller key is activated, where the signal can be used to control a cursor on a display. Each of the one or more input keys generates an input function when activated and can include one or more of an alphanumeric input, arrow key input, or function key input. In some cases, the controller key can be one or more of a shift key, control key, windows key, command key, alt key, dedicated controller key, or user-assigned key.

13 Claims, 8 Drawing Sheets

(51) Int. Cl.
*G06F 3/03* (2006.01)
*G06F 3/023* (2006.01)
*G06F 3/044* (2006.01)
*G06F 3/0338* (2013.01)
*G06F 3/0354* (2013.01)
*G06F 3/0488* (2013.01)

(58) Field of Classification Search
USPC .......... 345/156–178; 455/466, 566; 235/440; 715/773; 84/745
See application file for complete search history.

(56) References Cited

U.S. PATENT DOCUMENTS

| | | | |
|---|---|---|---|
| 8,022,933 B2 | 9/2011 | Hardacker et al. | |
| 9,444,454 B2* | 9/2016 | Hovden | H03K 17/9622 |
| 9,471,600 B2* | 10/2016 | Soderberg | G06F 17/30265 |
| 9,619,043 B2* | 4/2017 | Pate | G06F 3/021 |
| 2004/0017355 A1 | 1/2004 | Shim et al. | |
| 2005/0057489 A1 | 3/2005 | Kung et al. | |
| 2005/0190159 A1* | 9/2005 | Skarine | G06F 1/1626 |
| | | | 345/168 |
| 2007/0091070 A1* | 4/2007 | Larsen | G06F 3/0213 |
| | | | 345/168 |
| 2007/0241125 A1* | 10/2007 | Muderlak | E05B 1/0069 |
| | | | 221/71 |
| 2007/0283263 A1* | 12/2007 | Zawde | G06F 3/03547 |
| | | | 715/700 |
| 2008/0005594 A1* | 1/2008 | Adams | G06F 1/1616 |
| | | | 713/300 |
| 2008/0126977 A1* | 5/2008 | Keohane | G06F 3/0238 |
| | | | 715/773 |
| 2008/0242360 A1 | 10/2008 | Jang et al. | |
| 2008/0268931 A1* | 10/2008 | Alderucci | G07F 17/3209 |
| | | | 463/11 |
| 2008/0300055 A1* | 12/2008 | Lutnick | G07F 17/3209 |
| | | | 463/39 |
| 2009/0167696 A1* | 7/2009 | Griffin | H04M 1/236 |
| | | | 345/169 |
| 2009/0179860 A1 | 7/2009 | Wang et al. | |
| 2010/0155409 A1* | 6/2010 | Muderlak | E05B 1/0069 |
| | | | 221/30 |
| 2010/0164946 A1 | 7/2010 | Hyndman et al. | |
| 2010/0299710 A1 | 11/2010 | Shin et al. | |
| 2011/0205161 A1* | 8/2011 | Myers | G06F 3/016 |
| | | | 345/169 |
| 2012/0056733 A1* | 3/2012 | Ramsay | G06F 1/1626 |
| | | | 340/407.2 |
| 2012/0242514 A1* | 9/2012 | Hsuan | G06F 3/017 |
| | | | 341/22 |
| 2012/0293935 A1* | 11/2012 | Sherlock | G06F 1/163 |
| | | | 361/679.03 |
| 2012/0295711 A1* | 11/2012 | Odell | H03M 11/14 |
| | | | 463/37 |
| 2013/0050094 A1 | 2/2013 | Rhee et al. | |
| 2013/0082928 A1* | 4/2013 | Kim | G06F 3/0425 |
| | | | 345/168 |
| 2013/0135211 A1 | 5/2013 | Chiang et al. | |
| 2013/0173175 A1 | 7/2013 | Jung et al. | |
| 2013/0257734 A1* | 10/2013 | Marti | G06F 1/1686 |
| | | | 345/168 |
| 2013/0342494 A1 | 12/2013 | Feng et al. | |
| 2014/0006033 A1* | 1/2014 | Jung | G10L 15/22 |
| | | | 704/275 |
| 2014/0078063 A1* | 3/2014 | Bathiche | G06F 3/0234 |
| | | | 345/168 |
| 2014/0096667 A1* | 4/2014 | Chapman | G10H 1/0058 |
| | | | 84/609 |
| 2014/0226854 A1* | 8/2014 | Mazurenko | G06K 9/00201 |
| | | | 382/103 |
| 2014/0240234 A1 | 8/2014 | Bylander et al. | |
| 2014/0247695 A1* | 9/2014 | Vangeel | H04L 43/0811 |
| | | | 367/93 |
| 2014/0266814 A1 | 9/2014 | Hu et al. | |
| 2014/0327875 A1* | 11/2014 | Blum | A61F 2/1618 |
| | | | 351/159.03 |
| 2015/0035783 A1* | 2/2015 | Brillant | G06F 3/0416 |
| | | | 345/174 |
| 2015/0084902 A1* | 3/2015 | Atsumi | H04R 17/00 |
| | | | 345/173 |
| 2015/0091862 A1* | 4/2015 | Bertrand | G06F 3/044 |
| | | | 345/174 |
| 2015/0109207 A1 | 4/2015 | Li et al. | |
| 2015/0169053 A1* | 6/2015 | Bozarth | G06K 9/00604 |
| | | | 345/156 |
| 2015/0268855 A1 | 9/2015 | Gärdenfors et al. | |
| 2015/0279050 A1* | 10/2015 | Yang | G06T 19/006 |
| | | | 345/633 |
| 2015/0293592 A1 | 10/2015 | Cheong et al. | |
| 2016/0012465 A1* | 1/2016 | Sharp | G06Q 20/18 |
| | | | 705/14.17 |
| 2016/0047536 A1* | 2/2016 | Lien | F21V 23/003 |
| | | | 362/249.05 |
| 2016/0062590 A1* | 3/2016 | Karunamuni | G06F 3/0488 |
| | | | 715/863 |
| 2016/0124512 A1* | 5/2016 | Maruya | G06F 3/017 |
| | | | 715/863 |
| 2016/0139680 A1 | 5/2016 | Noorzai et al. | |
| 2016/0198995 A1* | 7/2016 | Yeung | A61B 5/4528 |
| | | | 600/595 |
| 2017/0160927 A1* | 6/2017 | Pate | G06F 3/021 |
| 2018/0096116 A1* | 4/2018 | Vaughn | G06F 21/34 |
| 2018/0364810 A1* | 12/2018 | Parshionikar | G06F 3/017 |

OTHER PUBLICATIONS

U.S. Appl. No. 14/557,345, "Non-Final Office Action", dated Jan. 20, 2016, 20 pages.
U.S. Appl. No. 14/557,345, "Notice of Allowance", dated Nov. 18, 2016, 10 pages.
CN201510837426.7, "Office Action", dated Sep. 11, 2018, 6 pages.
CN201510837426.7, "Office Action", dated Jan. 10, 2018, 9 pages.
CN201520956638.2, "Office Action", dated Mar. 1, 2016, 1 page.

* cited by examiner

KEYBOARD WITH TOUCH SENSITIVE ELEMENT

CROSS-REFERENCE TO RELATED APPLICATION

This application is a continuation of U.S. non-provisional patent application Ser. No. 14/557,345, filed Dec. 1, 2014, now U.S. Pat. No. 9,612,664, issued on Apr. 4, 2017, and titled KEYBOARD WITH TOUCH SENSITIVE ELEMENT, the disclosure of which is hereby incorporated by reference in its entirety for all purposes.

FIELD

Embodiments of the invention generally relate to peripheral devices for use in computer systems. More specifically, peripheral devices with integrated touch and motion sensitive technologies are described herein.

BACKGROUND

Conventional interface devices, such as mice and keyboards, are ubiquitous and remain the mainstay human interface devices (HIDS) in modern computing systems. Typically, keyboards provide a plurality of binary inputs (i.e., on/off). Hotkeys and macros can improve productivity and efficiency by allowing a user to perform multi-step functions, such as cutting and pasting, by pressing a predetermined combination of two or more keys. However, despite these improvements, conventional keyboards and mice still only provide limited input options and improvements in efficiency have largely remained bound by these limitations.

With the advent of touch pads, touch screens, and touch sensitive technologies in general, human interface devices have become more intuitive by allowing users to execute commands using more varied input options. For instance, some touch pads can detect many different types of inputs including taps, double taps, swipes, two or more finger swipes, pinches, reverse pinches, and many others. Touch sensitive input devices provide more intuitive input options to help users create more powerful and varied input commands.

Despite the advantages and additional options that touch sensitive devices can provide, the improved efficiencies are abated by the clutter of peripheral devices commonly found with modern computing devices. For example, many desktop computers include a keyboard, a mouse, a touch sensitive device (display, stand-alone unit, etc.), or other input device. The time it takes a user to switch between input devices can offset any advantages provided by the inherent efficiencies of each peripheral taken separately. Thus, despite recent enchancements in peripheral devices using touch sensitive technology, further improvements in both overall efficiency and design are needed.

BRIEF SUMMARY

Embodiments of the invention generally relate to peripheral devices for use in computer systems. More specifically, peripheral devices with integrated touch and motion sensitive technologies are described herein.

Some implementations of the invention include a keyboard having a plurality of keys, and a touch sensitive element disposed under the plurality of keys. The touch or motion sensitive element can detect lateral movement of a touch object (e.g., finger) along the surface of the plurality of keys. Thus, a motion sensor is "built-in" or "embedded" within the keys of the keyboard, such that cursor movement, gesture detection, and other touch or motion sensor operations can be implemented on the keys themselves without requiring the user to move her hands from the keyboard to make for a convenient and highly efficient touch pad solution. To prevent an inadvertent gesture or cursor movement (e.g., when a user shifts his hands or makes unintended movements), a controller key can be used to determine when to perform the touch or motion detection capabilities, or when to execute or process their corresponding signals. In some embodiments, the controller key can be the "shift" key on a standard alphanumeric QWERTY keyboard. In operation, the user can press the shift key with a left hand finger and move his right hand over the keys to initiate a cursor movement on a display, perform a touch gesture, or the like. Alternatively, the user can press the shift key with the left hand finger and depress one of the input keys (i.e., vertical movement with no lateral motion) to simply execute a standard "shift" operation. In some embodiments, this may include changing from a lower case letter to an upper case letter (e.g., h to H), or alternating between a number key and a symbol (e.g., 5 to %). There are many variations and permutations that can be applied to these concepts, as would be appreciated by one of ordinary skill in the art with the benefit of this disclosure. Some of these myriad possibilities are illustrated and described below.

In some embodiments, different types of sensors can be used such as capacitive sensors, a camera with smart algorithm processing (e.g., stereo vision, projected pattern, etc.), a camera embedding time of flight technology, sensors measuring a magnetic field (e.g., Hall sensors or Magnet sensors), and the like. The outputs from those sensors can provide X,Y,Z positions of the object (e.g., in a Cartesian coordinate system) with a time stamp. In some cases, object movement can be interpreted by a gesture engine to provide the decoded action to the PC. If the object is the hand, a number of fingers that are used to trigger the event can also be reported. Thus, multi-finger gestures are applicable in certain embodiments.

According to certain embodiments, an input device includes a processor, a plurality of keys, and a motion sensor controlled by the processor, the motion sensor disposed below a top surface of the one or more input keys. The plurality of keys can include a controller key, and one or more input keys. The motion sensor can generate a signal corresponding to a movement of an object along the top surface of the one or more input keys when the controller key is activated. In some implementations, each of the one or more input keys generates an input function when activated, where the input function can include one or more of an alphanumeric input, arrow key input, or function key input. The controller key can include one of a shift key, control key, windows key, command key, alt key, or default modifier key for the input device. In some cases, the controller key can be user-assignable. In some embodiments, the input device can include a keyframe, where the plurality of keys are disposed in the keyframe. Other embodiments may not include a keyframe.

The signal generated by the motion sensor can control a cursor on a display. In some implementations, the signal generated by the motion sensor can detect user finger or hand gestures over the surface of the one or more input keys. In further embodiments, the motion sensor operates in "3-D mode" and is operable to detect "air gestures," or generate raw data giving finger positions or hand positions performed over, near, or in proximity to the key frame. The motion sensor can be a capacitive sensor, time-of-flight sensor, resistive sensor, a camera with stereo vision, a camera projected pattern technology, sensors measuring a magnetic field, such as Hall sensors or Magnet sensors, or the like. In some cases, the motion sensor is a continuous layer configured below the one or more input keys.

According to some embodiments, a method for controlling an input device having a keyboard with a controller key and a plurality of input keys and a motion sensor controlled by a processor includes receiving, by the processor, a control signal indicating that the controller key is activated, and in response to receiving, by the processor, an input signal indicating that an input key of the plurality of input keys is activated, generating, by the processor, an input signal corresponding to an input function assigned to the input key. In response to receiving, by the processor, a sensor signal from the motion sensor indicating that a lateral movement is detected over one or more of the plurality of input keys, the method includes generating, by the processor, a motion signal corresponding to the lateral movement over the one or more of the plurality of input keys. The motion sensor can generate a sensor signal indicating a lateral movement when the movement over the one or more of the plurality of keys is greater than a predetermined threshold. The threshold is set to distinguish inadvertent movements or micro-movements of the hand or fingers that are not intended to be interpreted as a movement. The inclusion and determining of such a threshold would be appreciated by one of ordinary skill in the art.

In some implementations, the method includes one or more of controlling a cursor on a display based on the lateral movement detected over the one or more of the plurality of input keys and determining an input gesture based on the motion signal. The controller key can be one of a shift key, control key, windows key, command key, alt key, or default modifier key for the input device. In some cases, any key of a plurality of keys on the input device can be user-assigned as the controller key. The motion sensor can be a capacitive sensor, resistive sensor, time-of-flight sensor, a camera with stereo vision, a camera projected pattern technology, sensors measuring a magnetic field, such as Hall sensors or Magnet sensors, etc., or may include a combination thereof.

In further embodiments, a keyboard includes a plurality of keys disposed in the keyboard, and a motion-sensitive key frame. The plurality of keys can include a control key, and one or more input keys, where the control key and one or more input keys are configured to be depressible. The motion-sensitive key frame can generate a motion signal in response to the control key being depressed, and detecting a lateral movement of an object along the one or more input keys. The motion signal may correspond to the lateral movement of the object. The key frame can be disposed under at least a portion of the one or more input keys. The control key can be a shift key, control key, windows key, command key, alt key, or default modifier key for the input device. In some implementations, the motion signal is operable to control a cursor on a display or to generate a touch gesture corresponding to the lateral movement of the object along the one or more input keys. The key frame can be a capacitive sensor, resistive sensor, time-of-flight sensor, a camera with stereo vision, a camera projected pattern technology, sensors measuring magnetic field such as Hall sensors or Magnet sensors, or combinations thereof. In some cases, the key frame can be a continuous single layer configured adjacent to each of the plurality of keys.

DETAILED DESCRIPTION

Figure 1:
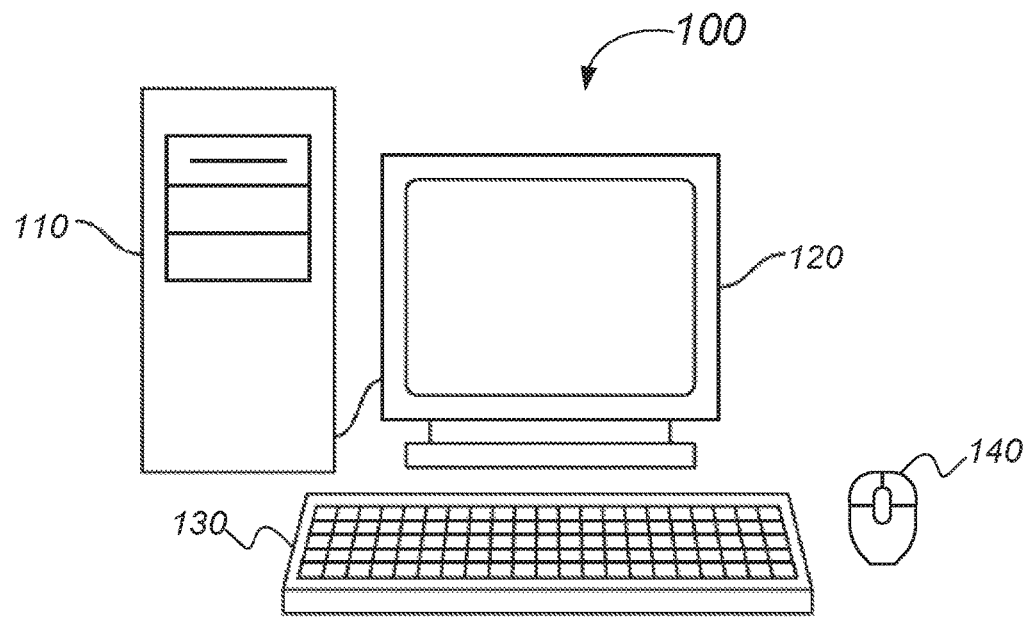
FIG. 1 is a simplified schematic diagram of a computer system, according to certain embodiments of the present invention.

Embodiments of the invention generally relate to peripheral devices for use in computer systems. More specifically, peripheral devices with integrated touch and motion sensitive technologies are described herein.

Some implementations of the invention include a keyboard having a plurality of keys, and a touch sensitive element disposed under the plurality of keys. The touch or motion sensitive element can detect lateral movement of a touch object (e.g., finger) along the surface of the plurality of keys. Thus, a touch pad is "built-in" or "embedded" within the keys of the keyboard, such that cursor movement, gesture detection, and other touch or motion sensor operations can be implemented on the keys themselves without requiring the user to move her hands from the keyboard to make for a convenient and highly efficient solution to replace and improve upon traditional touch pad implementations that require additional space and electronic infrastructure.

To prevent an inadvertent gesture or cursor movement (e.g., when a user shifts his hands or makes unintended movements), a controller key can be used to determine when to perform the touch or motion detection capabilities, or when to execute or process their corresponding signals. In some embodiments, the controller key can be the "shift" key on a standard alphanumeric QWERTY keyboard. In operation, the user can press the shift key with a left hand finger and move his right hand over the keys to initiate a cursor movement on a display, perform a touch gesture, or the like. Alternatively, the user can press the shift key with the left hand finger and depress one of the input keys (i.e., vertical movement with no lateral motion) to simply execute a standard "shift" operation. In some embodiments, this may include changing from a lower case letter to an upper case letter (e.g., h to H), or alternating between a number key and a symbol (e.g., 5 to %). There are many variations and permutations that can be applied to these concepts, as would be appreciated by one of ordinary skill in the art with the benefit of this disclosure. Some of these myriad possibilities are illustrated and described below.

In certain embodiments, an "in-air" motion sensor or video camera can be used to detect movements and identify gestures in 3D space. For example, a user may initiate the gesture sensing with a modifier button on an input device, such as a mouse. The motion sensor can be included on a keyboard, on a monitor, or any suitable location that can house the sensor. Alternatively, a camera can be disposed in any suitable location to interpret gestures and execute corresponding commands. In some embodiments, cameras can track eye movement to glean information about a user's focus and inititate corresponding commands when the modifier button is depressed. Some of the myriad possibilities using this technology are illustrated and further described below.

General Applications and System Level Design

The following examples are meant to provide the reader with a general understanding of the inventive concepts presented herein and in no way should be interpreted to limit the scope of their application. For example, the following embodiments include keyboards for computer systems, mice, or similar variants of input devices. It should be noted that the inventive concepts presented herein as a keyboard with lateral movement detection could apply to any plurality of keys (or single key) in any type of grouping, presentation, and the like. Similarly, the embodiments involving a mouse (e.g., with a modifier key) are not limited to computer mice alone. For example, a modifier key could be adapted to any suitable input device including trackballs, joysticks, touchpads, mobile phones, remote controls, or any other suitable input device, as would be appreciated by one of ordinary skill in the art.

FIG. 1 is a simplified schematic diagram of a computer system 100, according to certain embodiments of the present invention. Computer system 100 includes a computer 110, a monitor 120, a keyboard 130, and a control device 140. Keyboard 130 can be configured as a user input peripheral device to control computer 110. Keyboard 130 can be configured to implement any of the inventive concepts described herein individually or any combination thereof. For example, keyboard 130 can include touch or motion sensing capabilities (e.g., under the plurality of keys) to detect a movement of a user hand along the surface of the input keys. Keyboard 130 may include in-air detection capabilities to detect user hand gestures and interpret them as input signals. Furthermore, keyboard 130 can also be populated with one or more video cameras for eye tracking capabilities, as further described below. The various motion sensors, in-air 3-D sensors, and/or video cameras can be disposed in any suitable location that preferably and optimally performs the novel functions described herein. For example, sensors can be disposed on keyboard 130, monitor 120, computer 110, or any other suitable location in any combination thereof. Control device 140 can include a "modifier key" to toggle or enable in-air gesture sensing or video tracking, as further discussed below.

Computer 110 may include a machine readable medium (not shown) that is configured to store computer code, such as mouse driver software, keyboard driver software, and the like, where the computer code is executable by a processor (not shown) of the computer 110 to affect control of the computer by the mouse and keyboard. It should be noted that the input device 140 can be a mouse, input device, user interface device, control device, or the like.

Figure 2:
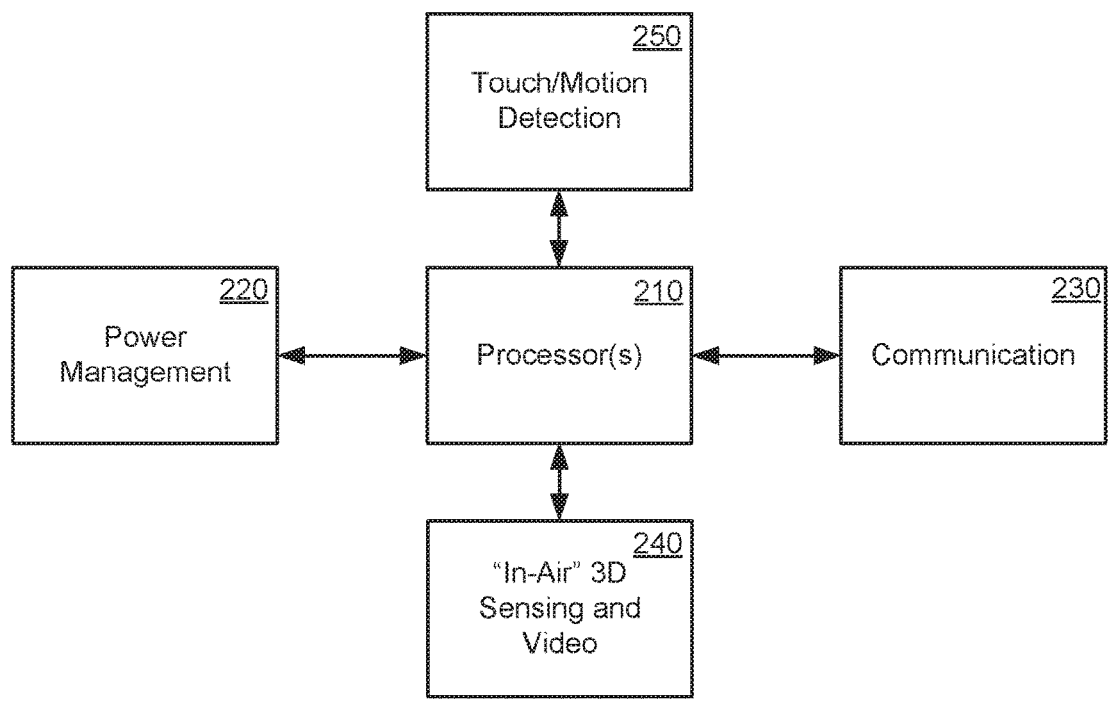
FIG. 2 is a simplified block diagram of a system configured to operate a motion and gesture detection system, according to certain embodiments of the invention.

FIG. 2 is a simplified block diagram of a system 200 configured to operate the motion and gesture detection systems described herein, according to certain embodiments of the invention. System 200 includes one or more processors 210, a power management system 220, a communications system 230, an "in-air" sensing and video block 240, and a motion detection system 250. Some embodiments may utilize only a motion detection system or an in-air sensing and video block. Each system block (e.g., 220-250) can be in electrical communication with processor 210. System 200 may include additional system blocks that are not shown or discussed to prevent obfuscation of the novel features described herein. Some implementations may not include certain system blocks. For example, embodiments using touch or motion detection (e.g., on a keyboard) may not include a 3-D sensing system 240, or vice versa. In some embodiments, system 200 can be incorporated into keyboard 130 of FIG. 1.

In certain embodiments, processor 210 comprises one or more microprocessors (μCs) and is configured to control the operation system 200. Alternatively, processor 210 may include one or more microcontrollers (MCUs), digital signal processors (DSPs), or the like, with supporting hardware/firmware (e.g., memory, programmable I/Os, etc.), as would be appreciated by one of ordinary skill in the art. Processor 210 can be configured to operate the keyboard 130 (or more generally, an input device) alone or in conjunction with other devices (e.g., control device 140, monitor 120, etc.), as further described below. Processor 210 can be disposed in the keyboard for local processing, located on a remote device (e.g., desktop computer) for off-board processing, or "processor 210" may be a combination of processors or processing infrastructure as would be appreciated by one of ordinary skill in the art.

Power management system 220 can be configured to manage power distribution, recharging, power efficiency, and the like, for the various subsystems (e.g., block 220-250) of system 200. Communications system 230 is configured to provide wireless communication between system 200 and a computer system (e.g., desktop computer, tablet computer, mobile device, etc.), according to certain embodiments of the invention. Communications system 230 can be controlled by processor 210 and configured to provide radio-frequency (RF) communication with any of a wide variety of wireless communication protocols including, but not limited to, Bluetooth, WiFi and infra-red wireless systems. In some cases, system 200 may optionally comprise means for hardwired communication, including a Universal Serial Bus (USB), or other suitable communications standard. Other embodiments of the invention may utilize different types of cables or connection protocol standards to effectuate a hardwired communication with outside entities.

Sensing and video block 240 can control aspects of "in air" detection corresponding to hand movements, finger movements or gestures made above or in proximity to certain features of the input device. In an exemplary embodiment, the in-air detection infrastructure detects movements or gestures made above a keyboard. In some cases, activating detection can correspond to toggling a controller key, as further discussed below. The sensor can be disposed in the keyboard or off-board (e.g., in a monitor, desktop, laptop frame, etc.). Block 240 can include any suitable motion detection device including, but not limited to, capacitive sensors, video cameras, time-of-flight sensors, a resistive sensor, a camera with stereo vision, a camera projected pattern technology, sensors measuring a magnetic field, such as Hall sensors or Magnet sensors, and the like, or a combination thereof. Aspects of in-air detection are discussed below with respect to FIGS. 9-10.

Touch and motion detection block 250 can control aspects of touch, movement, or gesture detection along the surface of the input device. For example, block 250 may control a sensor disposed below a set of keys to detect lateral movement along the surface of the keys. In some implementations, the activation and deactivation of touch and motion detection can correspond to the toggling of a controller key. Block 250 may control any number of touch sensors, controller keys, and implementations thereof. For example, some embodiments may include a touch sensor disposed beneath a plurality of keys. Some embodiments may utilize keys with touch sensitive properties. Other embodiments may implement multiple touch sensors for touch or motion detection for improved accuracy, to cover a number of remote areas (e.g., keyboard and number key pad), or the like. Touch and/or motion detection is further discussed below, e.g., in conjunction with FIGS. 3-6.

System 200 can include additional system blocks and functionality not necessarily shown or described in FIG. 2. For example, system 200 can include an input/output (I/O) system to operate and control inputs (e.g., keyboard, button, audio input, video input, etc.) and outputs in conjunction with communication block 230. System 200 and each subsystem therein can be implemented by aspects of one or more of software, firmware, or hardware as would be appreciated by one of ordinary skill in the art. Furthermore, aspects of system 200, including its many subsystems and embodiments thereof, can be implemented in any of the embodiments described herein (e.g., FIGS. 3-11) and in other manner not explicitly disclosed, as would be appreciated by one of ordinary skill in the art with the benefit of this disclosure.

Keyboard Implementations and Touch/Motion Sensing

Figure 3:
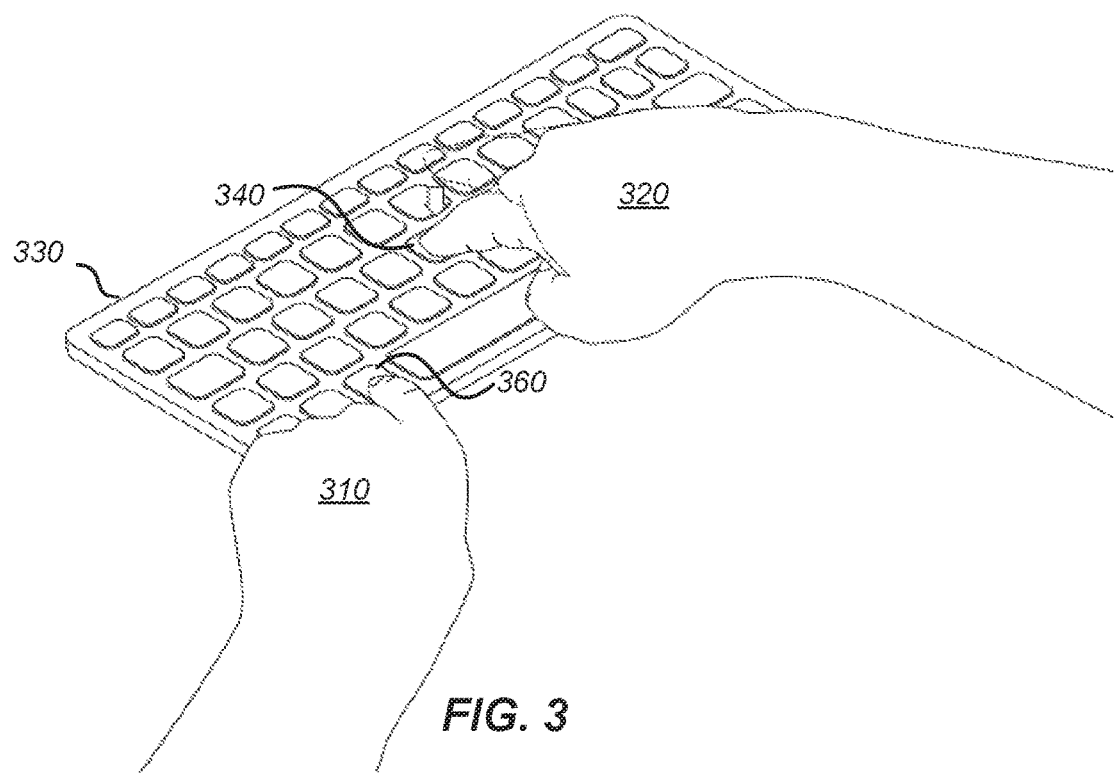
FIG. 3 is a simplified illustration depicting a user entering an alphanumeric input on a keyboard, according to certain embodiments of the invention.
Figure 4:
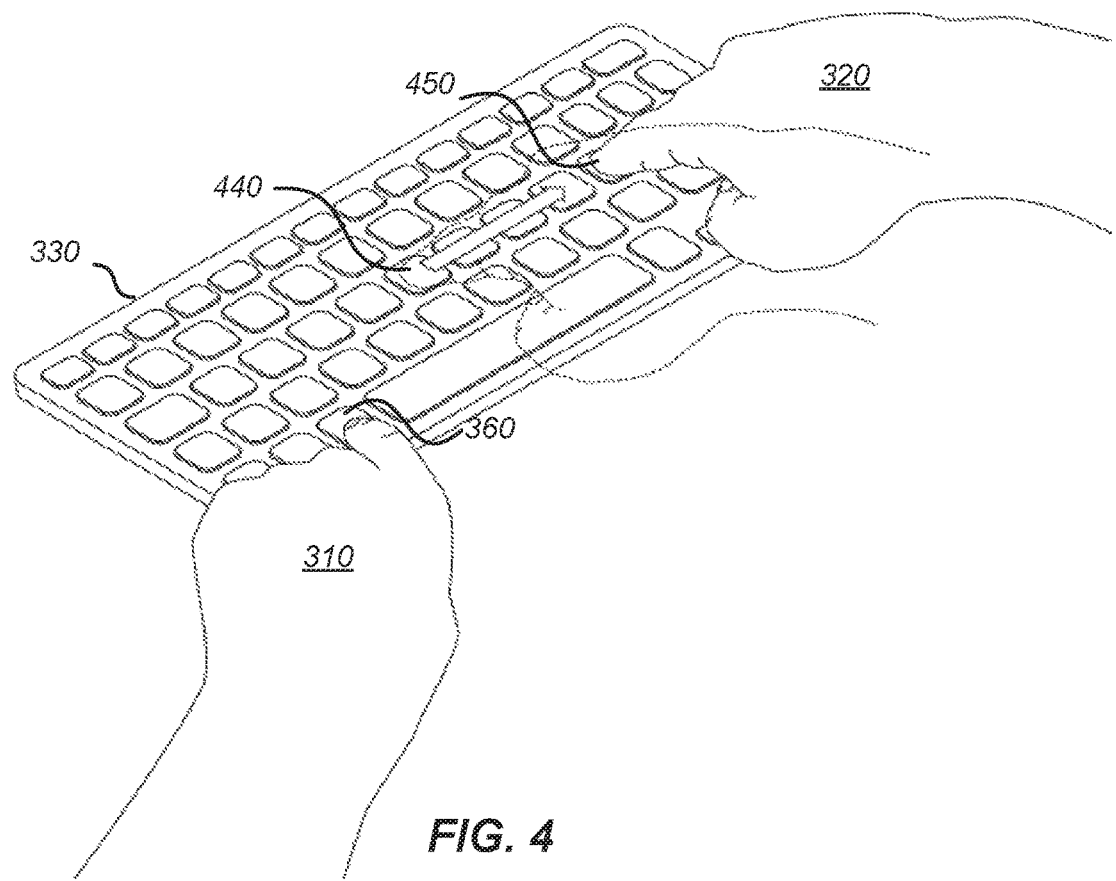
FIG. 4 illustrates a user entering a motion sensor input on a keyboard, according to certain embodiments of the invention.

FIGS. 3 and 4 depict how a keyboard can be used for both producing a conventional alphanumeric output and detecting a touch and/or movement along the surface of the keyboard in a reliable, accurate, and intuitive manner. Thus, the keys themselves can function as both an alphanumeric input and as a touch sensor based on the state of a user-activated control mechanism (e.g., control key). In some embodiments, a motion signal will only be generated when the control mechanism is activated (e.g., depressed). An advantage of using a controller key to control when touch or motion detection is active is to prevent unwanted or otherwise inadvertent motion signals or spurious gestures. Furthermore, utilizing a controller key that users are already accustomed to using to modify key functions (e.g., shift key) makes for a very intuitive interface that users can quickly adapt to with little to no learning curve. Users can simply remember that pressing the shift key enables motion detection and releasing the shift key disables it. The control key can be a mono-stable switch such that a user has to press and hold the control key to implement motion detection. Alternatively, the control key can be bi-stable such that pressing and releasing the control key enables motion detection, and pressing and releasing the control key again disables motion detection. Other methods of enabling and disabling motion detection would be appreciated by one of ordinary skill in the art with the benefit of this disclosure.

FIG. 3 is a simplified illustration depicting a user entering an alphanumeric input on a keyboard 330, according to certain embodiments of the invention. The user is using her left hand 310 to depress a controller key 360 while her right hand 320 depresses an input key 340 on keyboard 330. Controller key 360 can be any suitable key including, but limited to, a shift key, control key, windows key, command key, alt key, or a dedicated controller key. There may be more than one controller key (e.g., one on each side of the keyboard). The controller key can be a factory preset or user defined, e.g., via software configuration. Keyboard 330 can be keyboard 130 of FIG. 1, or any suitable input device having a plurality of input keys (e.g., remote control, computer mouse, game controller, etc.).

Referring back to FIG. 3, an example of a simple shift-key function is shown. Controller key 360 can be a "shift" key and input key 340 is an alphanumeric key (i.e., "g" key). Pressing the controller key 360 while simultaneously pressing input key 340 produces an alternate function, such as "all caps," a symbol, or the like, similar to the operation of conventional alphanumeric keyboards.

FIG. 4 illustrates a user entering a motion sensor input on keyboard 330, according to certain embodiments of the invention. Keyboard 330 can include a motion sensor to allow a user to efficiently provide touch sensor inputs (e.g., touch gestures, cursor control, etc.) without having to remove the user's fingers from the keyboard. In some embodiments, pressing controller key 360 activates the motion sensor, thereby causing it to generate sensor signals corresponding to an object's (e.g., finger) movement along the surface of the keyboard while controller key 360 is depressed. Referring to FIG. 4, the user uses her left hand 310 to depress a controller key 360 while her right hand 320 moves laterally along the surface of key 440 toward key 450 on keyboard 330. This lateral movement is detected by the motion sensor when controller key 360 is activated. The motion sensor then generates a motion signal that corresponds to a movement of the finger along the surface. The motion signal may be used to control a cursor on a screen, determine a gesture (e.g., pinch, swipe, tap, etc.), determine when a user moves his hand away from the keyboard, provide raw data indicating finger position and/or hand position on or above the surface of the keyboard, and the like, as would be appreciated by one of ordinary skill in the art with the benefit of this disclosure.

The touch or motion sensor can be disposed under, adjacent to, or on the keys themselves. In an exemplary embodiment, the touch sensor is a key frame (or integrated therewith) and is disposed under one or more of the plurality of keys on keyboard 330. The touch sensor can be a capacitive sensor configured to detect movement of a user's fingers along the surface of one or more keys on keyboard 330. Other sensors can be used including resistive sensors, optical sensors, pressure sensors, time-of-flight (TOF) sensors, and the like. TOF sensors, optical sensors, and cameras can be used to detect "3-D" touch capability where a user "hovers" over the keyboard, e.g., at a higher elevation, which is further discussed below with respect to FIGS. 9-10. The controller key can include one of a shift key, control key, windows key, command key, alt key, default modifier key for the input device (i.e., a default key typically used to modify a key function), combination of keys, hot keys, or a dedicated key (i.e., a key solely dedicated to function as a controller key). In some cases, the controller key can be user-assignable.

Figure 5:
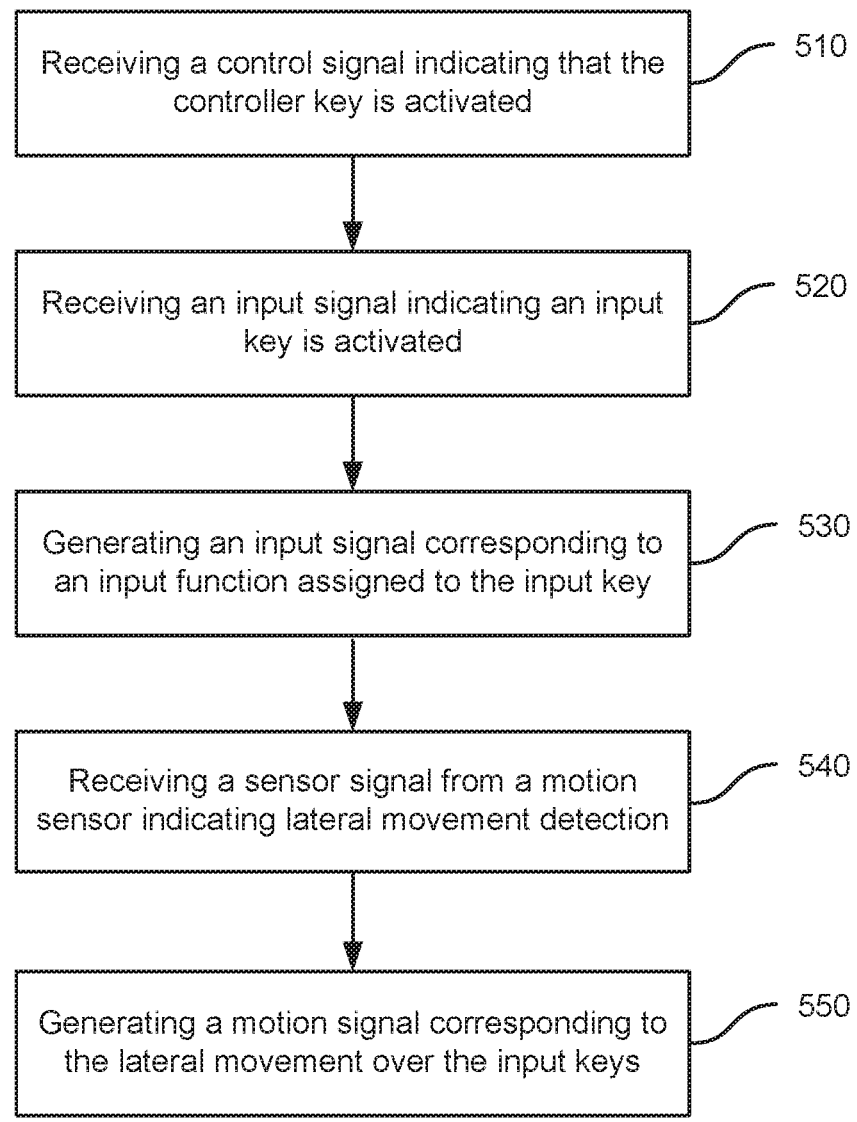
FIG. 5 depicts a simplified flow diagram illustrating aspects of a method of motion detection on an input device, according to certain embodiments of the invention.

FIG. 5 depicts a simplified flow diagram illustrating aspects of a method 500 of motion detection on an input device, according to certain embodiments of the invention. The method 500 is performed by processing logic that may comprise hardware (e.g., circuitry, dedicate logic, etc.), software (which is run on a general purpose computing system or a dedicated machine), firmware (embedded software), or any combination thereof. In one embodiment, method 500 is performed by the processor 210 and keyboard 130.

Referring to FIG. 5, method 500 begins with receiving a control signal indicating that the controller key is activated (step 510). For example, this can be when a user presses and holds the controller key. In some embodiments, the controller key can include one of a shift key, control key, windows key, command key, alt key, default modifier key for the input device, combination of keys, hot keys, or a dedicated key. In some cases, the controller key can be user-assignable. The controller key can be a mono-stable switch (press and hold), bi-stable switch (toggle functions with each press), or other suitable implementation. In some embodiments, the controller key is key 360 (the shift key) of FIGS. 3-4.

Step 520 includes receiving an input signal indicating that an input key is activated. For example, a user may press a letter key (e.g., the "G" key) to activate it. At step 530, if the input key is pressed while the controller key is pressed, or the input key and control key are pressed simultaneously, then method 600 includes generating an input signal corresponding to an input function assigned to the input key. In the example above, this is equivalent to pressing the shift key and the "G" key to produce a capital "G" (i.e., the input function of the input key). Although motion detection is activated by the pressing of the control key, no motion signal is generated because no movement along the surface of the keyboard (or other touch or motion sensitive area) is detected. If the control key was not activated at the time the input key was pressed, then motion detection is deactivated.

At step 540, if the controller key is pressed and a user moves his hand or fingers laterally across the keys, then the processor receives a sensor signal from the motion sensor indicating lateral movement detection. In the example above, if a user activates the controller key (presses and holds) while moving his finger along the surface of the keys (e.g., as shown in FIG. 4), the motion sensor sends a motion signal corresponding to the detected motion. The motion signal can include raw position data, movement data, etc., as would be appreciated by one of ordinary skill in the art. At step 550, in response to receiving an indication that the controller key is pressed and lateral movement is detected, the processor generates a motion signal corresponding to the lateral movement over the input keys (i.e., over the motion sensor).

It should be appreciated that the specific steps illustrated in FIG. 5 provide a particular method of motion detection on an input device, according to an embodiment of the present invention. Other sequences of steps may also be performed according to alternative embodiments. For instance, in some embodiments, a user can activate the controller key and perform a series of key presses and movements in a different order than described in method 500. For example, a user can press and hold the controller key while performing all of (1) pressing the "K" key, (2) laterally moving a finger along the surface of the keys, (3) pressing the "T" key, (4) releasing the controller key, (5) moving the finger along the surface of the keys, and (6) pressing the "T" key again. In some embodiments, this particular set of inputs would result in the input of an upper case "K," followed by a cursor movement corresponding to the movement of the finger along the surface of the keys, then an input of an upper case "T," followed by an input of a lower case "t." Note that the release of the controller key disabled the motion detection such that movement of the finger along the keys while the controller key was deactivated was not detected.

Thus, certain embodiments of method 500 may perform the individual steps in a different order, at the same time, or any other sequence for a particular application, as noted above. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Figure 6:
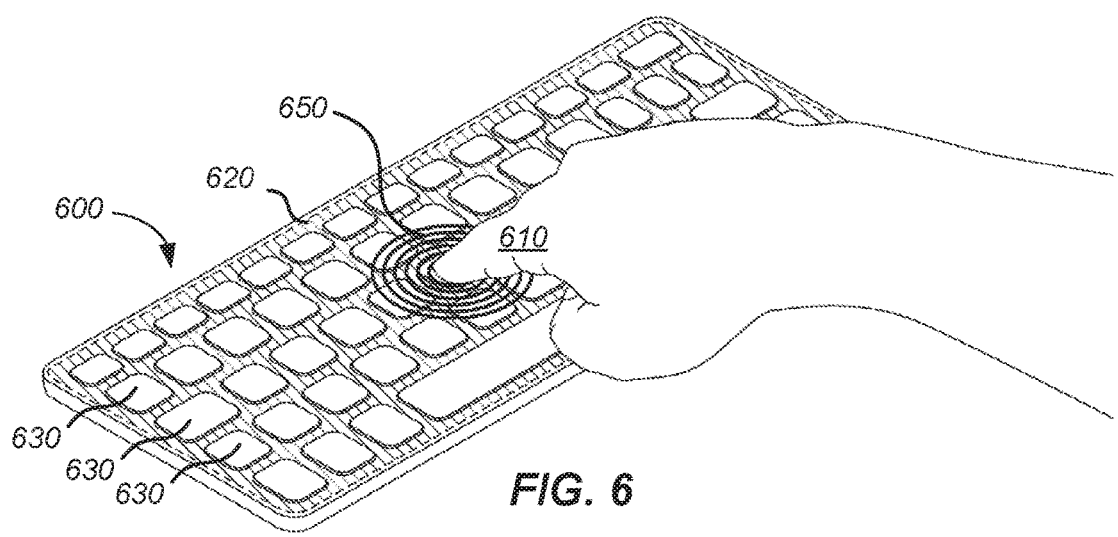
FIG. 6 illustrates a simplified diagram of an input device having a plurality of input keys and a touch or motion sensitive element, according to certain embodiments of the invention.

FIG. 6 illustrates a simplified diagram of an input device 600 having a plurality of input keys 630 and a touch or motion sensitive element 620, according to certain embodiments of the invention. Input device 600 can be a keyboard (shown), keypad, computer mouse, remote control, or other suitable input device with one or more buttons, a touch or motion sensitive element, and a controller key. FIG. 6 illustrates a user touching the keyboard at location 650 with a finger 610. In this embodiment, the touch or motion sensor is the key frame 620. In some embodiments, the key frame may be motion sensitive over smaller areas, multiple areas, or the like. One of ordinary skill in the art would appreciate the many configurations and permutations possible with a key frame with motion sensing capabilities. Referring back to FIG. 6, the controller key is pressed (not shown) and the motion sensor 620 (key frame) detects the presence of the finger over the keyboard and generates a motion signal corresponding to the location and/or movement of the finger, as further described above. The key frame can be disposed below the keys, around the keys, above the keys, near the keys, or even be a part of each of the keys (individually or as a whole).

Figure 7:
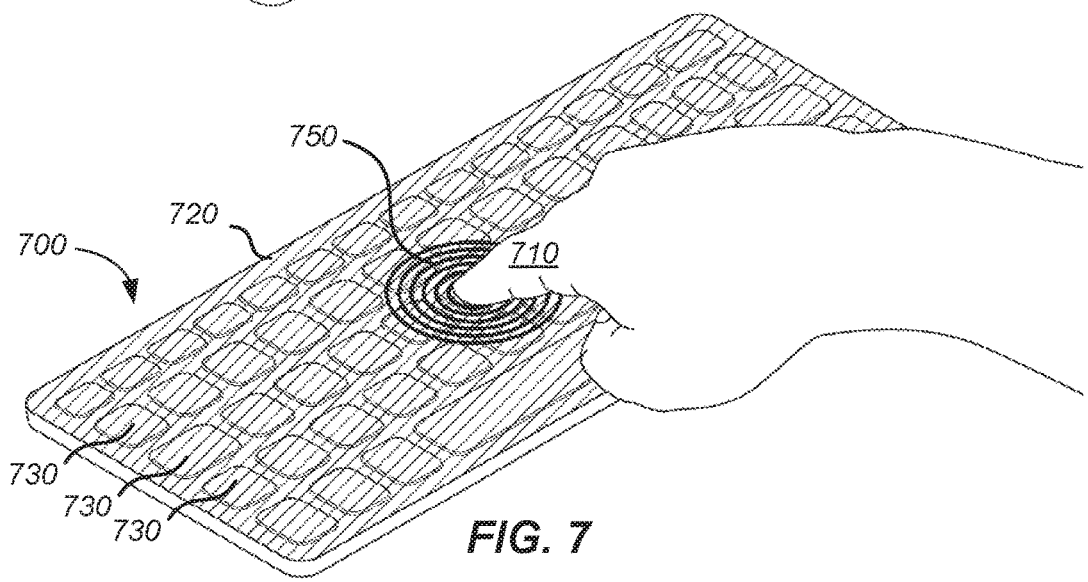
FIG. 7 illustrates a simplified diagram of an input device having a plurality of input keys and a touch or motion sensitive element, according to certain embodiments of the invention.

FIG. 7 illustrates a simplified diagram of an input device 700 having a plurality of input keys 730 and a touch or motion sensitive element 720, according to certain embodiments of the invention. Input device 700 can be a keyboard (shown), keypad, computer mouse, remote control, or other suitable input device with one or more buttons, a touch or motion sensitive element, and a controller key. A user is touching the keyboard at location 750 with a finger 710. In this embodiment, the touch/motion sensor 720 is disposed over the input keys 730. In some embodiments, motion sensor 720 may only cover smaller areas, multiple areas, or the like. One of ordinary skill in the art would appreciate the many configurations and permutations possible with the motion sensor disposed over the input keys 730. Referring back to FIG. 7, the controller key is pressed (not shown) and the motion sensor 720 detects the presence of the finger over the keyboard and generates a motion signal corresponding to the location and/or movement of the finger, as further described above.

Figure 8:
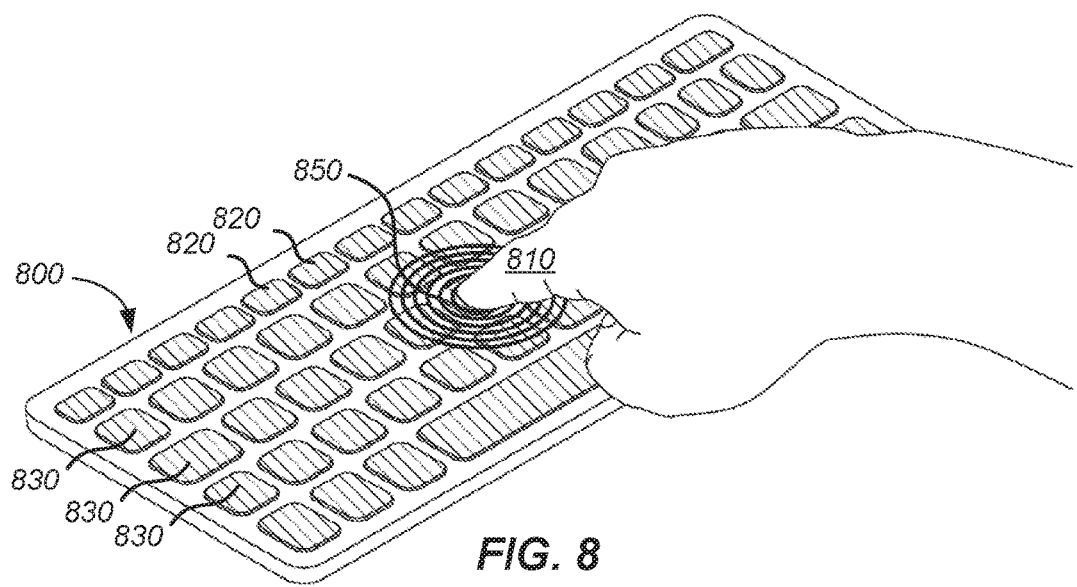
FIG. 8 illustrates a simplified diagram of an input device having a plurality of input keys and touch or motion sensitive elements, according to certain embodiments of the invention.

FIG. 8 illustrates a simplified diagram of an input device 900 having a plurality of input keys 830 and touch or motion sensitive elements 820, according to certain embodiments of the invention. Input device 800 can be a keyboard (shown), keypad, computer mouse, remote control, or other suitable input device with one or more buttons, a touch or motion sensitive element, and a controller key. A user is touching the keyboard with a finger 810. In this embodiment, the touch/motion sensor 820 is included on each individual input key 850. In some embodiments, motion sensors may only be present on some keys, all the keys, etc. One of ordinary skill in the art would appreciate the many configurations and permutations possible with motion sensors disposed on the individual input keys. Referring back to FIG. 8, the controller key is pressed (not shown) and a motion sensor 820 under the finger (hand 810) detects its presence and generates a motion signal corresponding to the location and/or movement of the finger, as further described above. An exemplary embodiment may use resistive or capacitive sensors disposed on or near the surface of one or more of the individual keys.

3D and "in-Air" Gesture Detection

In certain embodiments of the invention, 3D detection or "In-Air" detection is possible. In-Air detection refers to the ability to detect gestures or movement in a 3D space in a certain region. In the following examples, in-air detection occurs above the input device as opposed to along the surface of the input device, as shown and described above in FIGS. 3-8.

In-air detection can utilize a number of different types of motion detectors including, but not limited to, time-of-flight (TOF) sensors, optical sensors, motion capture technology (e.g., video cameras), or other suitable motion detection implementation.

TOF technology can provide 3-D imaging using a CMOS pixel array in conjunction with an active light source. Compact construction, together with good accuracy and frame-rate makes TOF cameras an excellent solution for the motion detection concepts described herein. A 3-D TOF camera works by illuminating a scene with a modulated light source, and observing the reflected light. The phase shift between the illumination and the reflection is measured and translated into a distance. The illumination may be from a solid-state laser or an LED, typically operating in the near-infrared range (~850 nm). An imaging sensor configured to detect the same spectrum receives the light and converts the photonic energy to electrical current. The operation and implementation of TOF sensors, as applied to the embodiments described herein, would be appreciated by one of ordinary skill in the art with the benefit of this disclosure.

Figure 9:
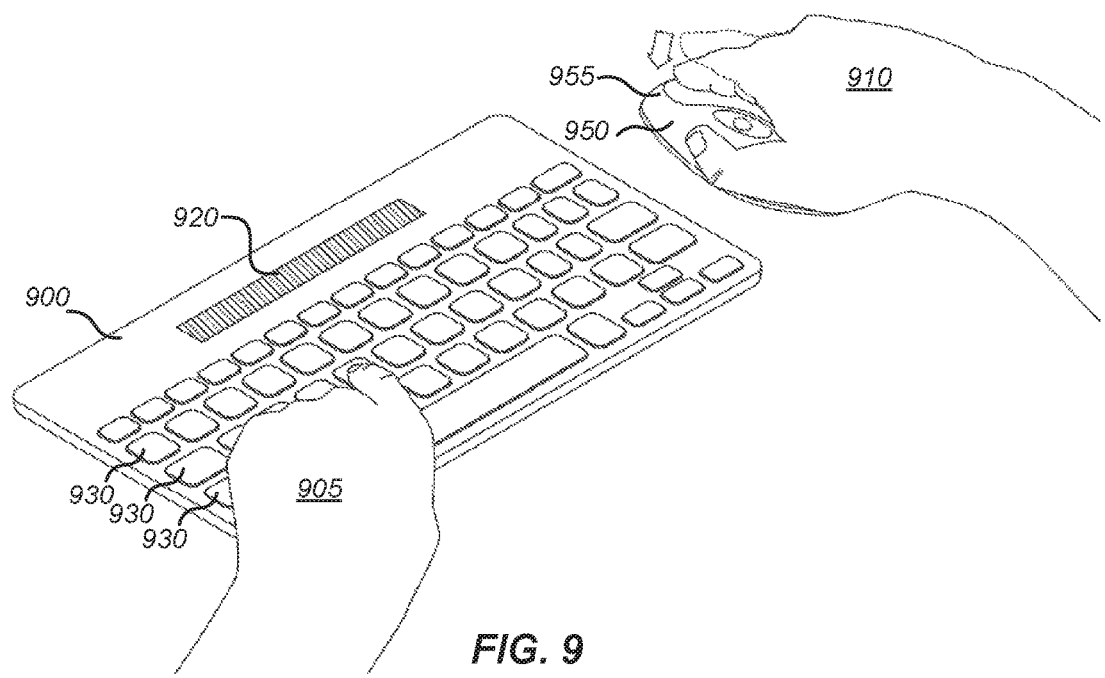
FIG. 9 is a simplified diagram illustrating an input device having a plurality of input keys, a 3-D motion sensor, and a control device, according to certain embodiments of the invention.
Figure 10:
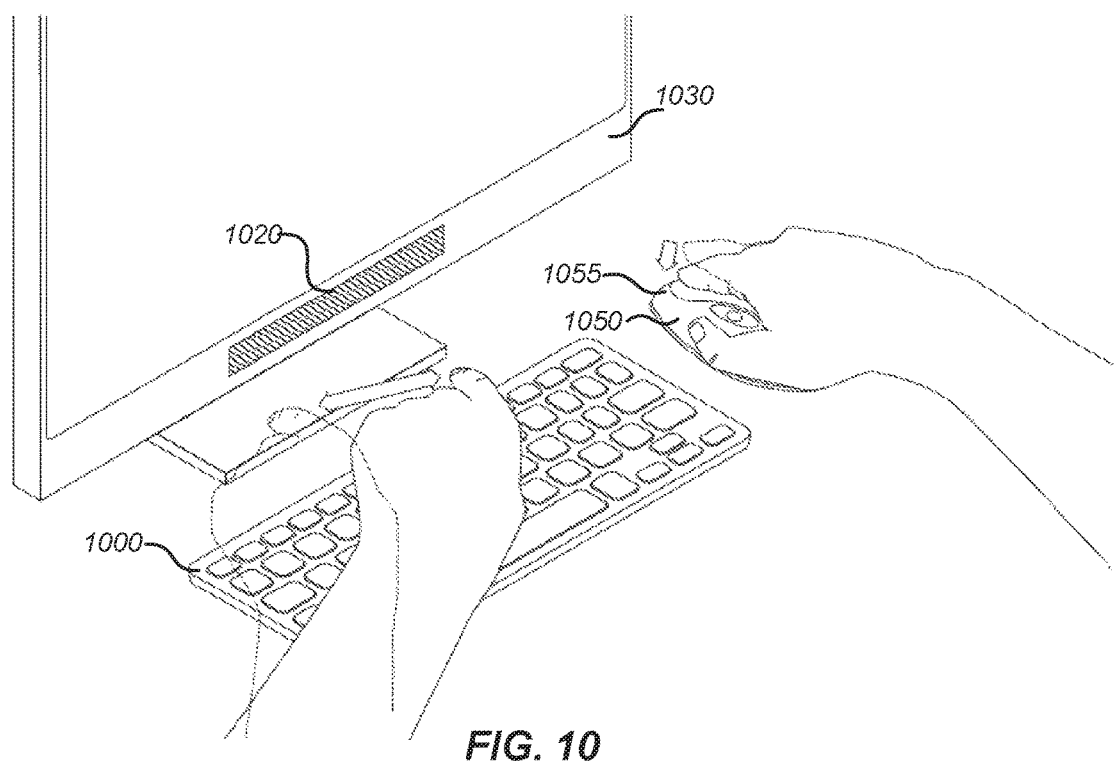
FIG. 10 is a simplified diagram illustrating an input device having a plurality of input keys, a 3-D motion sensor disposed on a monitor, and a control device, according to certain embodiments of the invention.

FIGS. 9 and 10 illustrate aspects of input devices using 3-D motion detection. 3-D sensors can be placed on any suitable surface, including on the input device (e.g., keyboard 900 of FIG. 9), a remote location (e.g., the monitor of FIG. 10), or a combination of 3-D sensors. The following embodiments work similarly in concept to the embodiments of FIGS. 3-8, with the exception that the controller key (e.g., input device 950 of FIG. 9) and/or the motion sensor (e.g., sensor 1020 of FIG. 10) are shown to be located on a remote device.

FIG. 9 is a simplified diagram illustrating an input device 900 having a plurality of input keys 930, a 3-D motion sensor 920, and a control device 950, according to certain embodiments of the invention. Control device 950 includes a controller key 955. In FIG. 9, the control device 950 is a computer mouse and the controller key 955 is a button disposed thereon. FIG. 9 depicts the control key 955 being depressed by user hand 910, which enables motion detection by 3-D sensor 920. The 3-D motion sensor 920 detects the movement of an object (e.g., user hand) in a 3-D space above the input device 900. The volume of 3-D space depends on the positioning and capabilities of the motion sensor 920. In operation, a user presses and holds the controller key 955 while moving or placing his hand (e.g., hand 905) above the input device 900. Motion sensor 920 can detect the location and movement of the hand, and generate a motion signal corresponding to the location and/or movement of the hand while the controller key 955 is being depressed. Because a larger volume area can be detected with a 3-D sensor, as opposed to a capacitive sensor, which may only detect a touch or movement along the surface of the input device, more input options may be possible. For instance, more complex hand gestures are possible in a larger 3-D volume. Some non-limiting examples include volume up/down by moving an object (e.g., hand) along a Z axis, scrolling up/down with a gesture along the screen, zooming in/out with Z axis, Windows switching with horizontal swipes, closing an application with quick vertical swipes, and more. Motion sensor 920 can be a time-of-flight (TOF) sensor, optical sensor, or other suitable motion detection implementation, as would be appreciated by one of ordinary skill in the art.

FIG. 10 is a simplified diagram illustrating an input device 1000 having a plurality of input keys, a 3-D motion sensor 1020 disposed on a monitor 1030, and a control device 1050, according to certain embodiments of the invention. Control device 1050 includes a controller key 1055. FIG. 10 is similar to FIG. 9 except for the fact that the 3-D motion detector is located on a remote device, i.e., on a monitor 1030. That is, FIG. 10 depicts a control key 1055 being depressed by a user hand 1010, which enables motion detection by a 3-D sensor 1020. The 3-D motion sensor 1020 detects the movement of an object (e.g., user hand 1010) in a 3-D space in a volumetric space near sensor 1020 (e.g., above keyboard 1000). It should be understood that motion detectors can be disposed in any suitable location, depending on the particular application. In some embodiments, multiple sensors may be used to improve accuracy or provide additional input options (e.g., greater detection range and volume).

One advantage of controlling an in-air sensor with a controller key (e.g., mouse button, "shift" button, etc.) is to prevent spurious gestures that may occur and are typically prevalent with 3-D sensors and video cameras configured to detect movements, air gestures, and the like. While 3-D sensors may track movement with high accuracy, some movements may be inadvertent or unintended. For example, a 3-D motion sensor may track movements like typing, small head or body movements, or the like, as intended gestures. Allowing a user to control when a 3-D motion sensor is activated can increase the likelihood that a detected in-air movement was intended by the user.

The embodiments described herein generally refer to touch and motion detection of a user hand placed proximate to an input device. It should be understood that many permutations and adaptations are possible and would be appreciated by one of ordinary skill in the art with the benefit of this disclosure. For instance, motion sensors placed at eye level can track eye movement and generate motion signals corresponding to the eye movement. This may be useful for determining which virtual desktop window or icon a user is currently looking at. Users could select windows, applications, or control aspects of their desktop with simple eye movements. In such implementations, it can be appreciated how important it would be to only generate eye tracking signals when it is intended.

Figure 11:
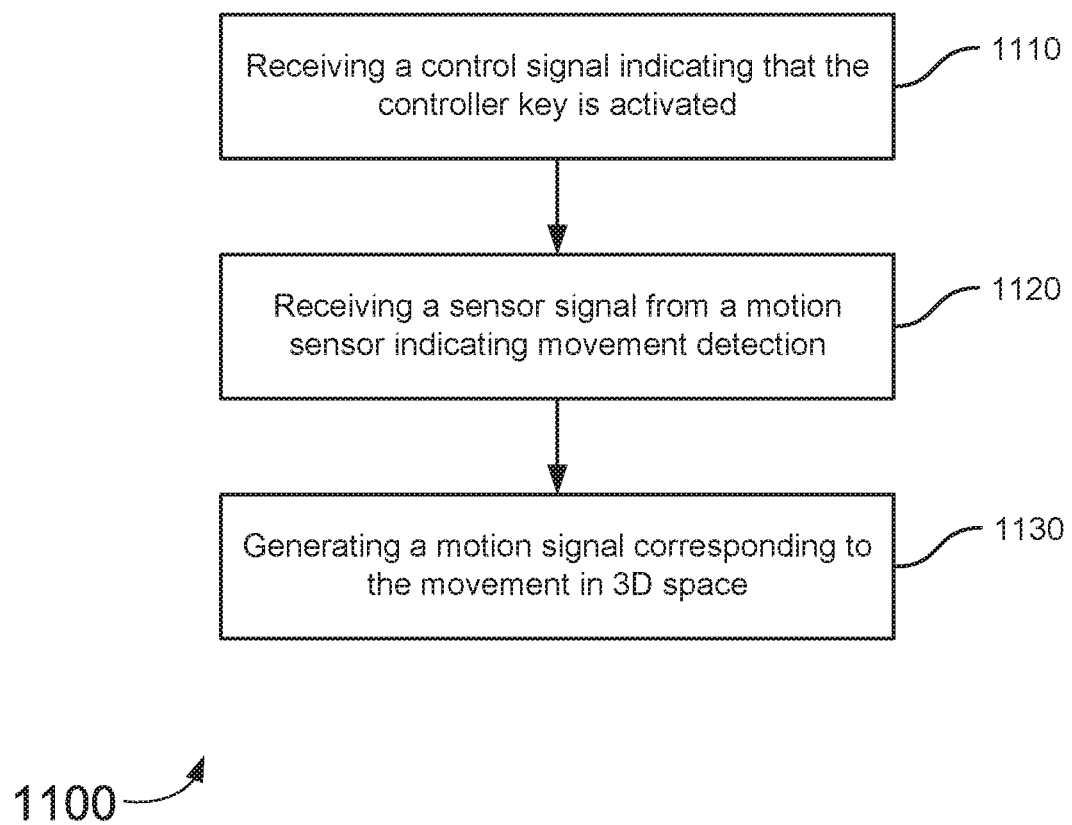
FIG. 11 depicts a simplified flow diagram illustrating aspects of a method of three-dimensional motion detection on an input device, according to certain embodiments of the invention.

FIG. 11 depicts a simplified flow diagram illustrating aspects of a method 500 of three-dimensional motion detection on an input device, according to certain embodiments of the invention. The method 1100 is performed by processing logic that may comprise hardware (e.g., circuitry, dedicate logic, etc.), software (which as is run on a general purpose computing system or a dedicated machine), firmware (embedded software), or any combination thereof. In some embodiments, method 1100 is performed by the processor 210, keyboard 1000, input device 1050, and monitor 1030. In certain embodiments, a 2D/Motion sensor can be used.

Referring to FIG. 11, method 1100 begins with receiving a control signal indicating that the controller key is activated (step 1110). For example, this can be when a user presses and holds the controller key. In some embodiments, the controller key can include one of a shift key, control key, windows key, command key, alt key, a default modifier key for the input device, combination of keys, hot keys, or a dedicated key. In some cases, the controller key can be user-assignable. The controller key can be a mono-stable switch (press and hold), bi-stable switch (toggle functions with each press), or other suitable implementation. Referring back to FIG. 10, the controller key 1055 can be the left button of input device 1050.

Step 1020 includes receiving a sensor signal from the motion sensor indicating movement detection. Referring back to FIGS. 9-10, movement can include any 3-D movement within a particular volumetric area detectable by the corresponding motion sensor. In FIG. 9, this would correspond to a volumetric area relative to motion sensor 920. In FIG. 10, the detected motion would correspond to movement in a volumetric area relative to motion sensor 1020. Motion sensor placement can be determined based on the intended application. For instance, a 3-D motion sensor would likely be placed on or proximate to a keyboard to detect hand movements close to the surface of the keyboard. In contrast, a 3-D motion detector may be placed in a higher location to detect head or body movements. A 3-D motion sensor's optimal placement, range, configuration, and the like, would be appreciated by one of ordinary skill in the art with the benefit of this disclosure. In the example above, if a user activates the controller key (presses and holds) while moving an object (e.g., hand) within the motion sensor's detectable range, the motion sensor sends a motion signal corresponding to the detected motion. The motion signal can include raw position data, movement data, etc., as would be appreciated by one of ordinary skill in the art. At step 1130, in response to receiving an indication that the controller key is pressed and movement is detected, the processor generates a motion signal corresponding to the detected movement.

It should be appreciated that the specific steps illustrated in FIG. 11 provide a particular method of 3-D motion detection on an input device, according to an embodiment of the present invention. Other sequences of steps may also be performed according to alternative embodiments. Certain embodiments of method 1100 may perform the individual steps in a different order, at the same time, or any other sequence for a particular application, as noted above. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

Alternative Embodiments

The following embodiments are intended to illustrate various alternative and derivative uses of the technologies described herein and are not intended to be limiting. It should be understood that many variations, adaptations, and configurations are possible, as would be appreciated by one of ordinary skill in the art.

In certain embodiments, touch or motion sensitive areas can be cover any suitable area—large or small, and may be user definable. For example, referring to the keyboard of FIG. 6, the touch sensitive area can cover the entire keyboard or a small subset thereof. In one embodiment, a touch sensitive area may be limited to a single key (e.g., the 'J' key) and a certain radius or distance around the single key. For instance, the touch or motion sensitive area can be one or more adjacent keys around a central key. The touch sensitive area can be defined by a distance (e.g., 3 cm around the central key). These examples are not intended to be limiting.

Figure 12:
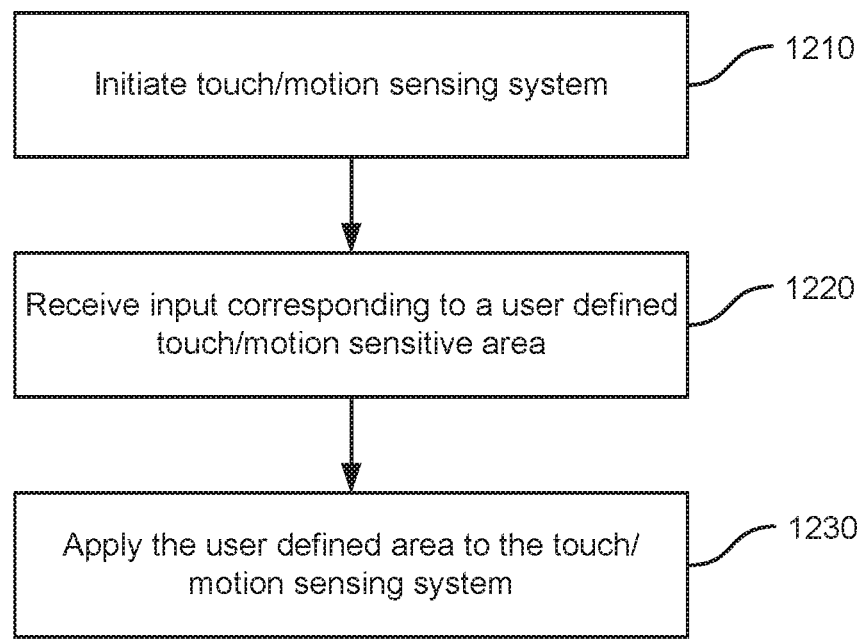
FIG. 12 depicts a simplified flow diagram for a method of defining aspects of a touch/motion detection system, according to certain embodiments of the invention.

FIG. 12 depicts a simplified flow diagram for a method 1200 of defining aspects of a touch/motion detection system, according to certain embodiments of the invention. Method 1200 can be performed by processing logic that may comprise hardware (e.g., circuitry, dedicate logic, etc.), software (which as is run on a general purpose computing system or a dedicated machine), firmware (embedded software), or any combination thereof. In some embodiments, method 1200 can be performed by the processor 210, keyboard 1000, input device 1050, and/or monitor 1030.

Referring to FIG. 12, method 1200 begins with initiating a touch and/or motion sensing system (step 1210). For example, the touch system of FIG. 6, the 3D motion detection system of FIG. 10, or of the embodiments described herein. At step 1220, a user input is received. The user input defines touch/motion detection area of the detection system. For example, a user can define which key or set of keys are touch/motion sensitive and further define a touch or motion sensitive range around the key (e.g., number of keys around defined touch/motion sensitive key(s), radial distance from defined touch/motion sensitive keys(s), etc.). In certain embodiments, user-defined touch or motion sensitive areas can be cover any suitable area—large or small, and may be user definable. For example, referring to the keyboard of FIG. 6, the touch sensitive area can cover the entire keyboard or a small subset thereof. In one embodiment, a touch sensitive area may be limited to a single key (e.g., the 'J' key) and a certain radius or distance around the single key. For instance, the touch or motion sensitive area can be one or more adjacent keys around a central key. The touch sensitive area can be defined by a distance (e.g., 3 cm around the central key). These examples are not intended to be limiting. At step 1230, the user defined touch/motion sensitive area is applied to the touch/motion sensing system.

It should be appreciated that the specific steps illustrated in FIG. 12 provide a particular method of defining aspects of a touch/motion detection system, according to an embodiment of the present invention. Other sequences of steps may also be performed according to alternative embodiments.

Certain embodiments of method 1200 may perform the individual steps in a different order, at the same time, or any other sequence for a particular application, as noted above. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

In some implementations, touch sensitive parameters (e.g., motion sensitivity) can be user definable. For example, a user can define which key or set of keys are touch/motion sensitive and further define a touch or motion sensitive range around the key (e.g., number of keys around defined touch/motion sensitive key(s), radial distance from defined touch/motion sensitive keys(s), etc.). In some embodiments, users can define a sensitivity of the touch/motion sensitive region. For instance, a small movement may move a cursor on a screen a short distance or a long distance depending on the defined sensitivity. Outside influences can also affect the effective sensitivity of a touch or motion sensitive region. For example, cursor movement can be affected by the resolution of a display (e.g., monitor, touch screen, etc.). Screen resolution is commonly measured in dots-per-inch (DPI). A detected movement on a touch sensitive keyboard may cause a significantly farther cursor movement on a display having a low resolution versus a display having a high resolution. Thus, a movement causing a cursor movement of 300 dots would vary depending on the resolution of the monitor.

In further embodiments, dual simultaneous modes of touch/motion detection are possible. For example, systems can use both in-air 3D detection (e.g., see FIG. 10) and keyboard touch/motion detection (e.g., see FIG. 6) to implement a dual coarse/fine-tune detection scheme. In some implementations, an in-air 3D detection system can be used for coarse measurements and a keyboard touch sensitive system can be used for a fine tuned measurement. For example, a user may make an in-air gesture on an auxiliary system (e.g., camera based in-air detection system) to move a cursor or pointer to a general area on a display, and then use the keyboard system to fine tune the movement of the cursor or pointer. The sensitivity of each system can be programmed accordingly. In one embodiment, the keyboard system may use the single key embodiments described above (e.g., touch sensitive "J" key with a touch sensitive radius).

Figure 13:
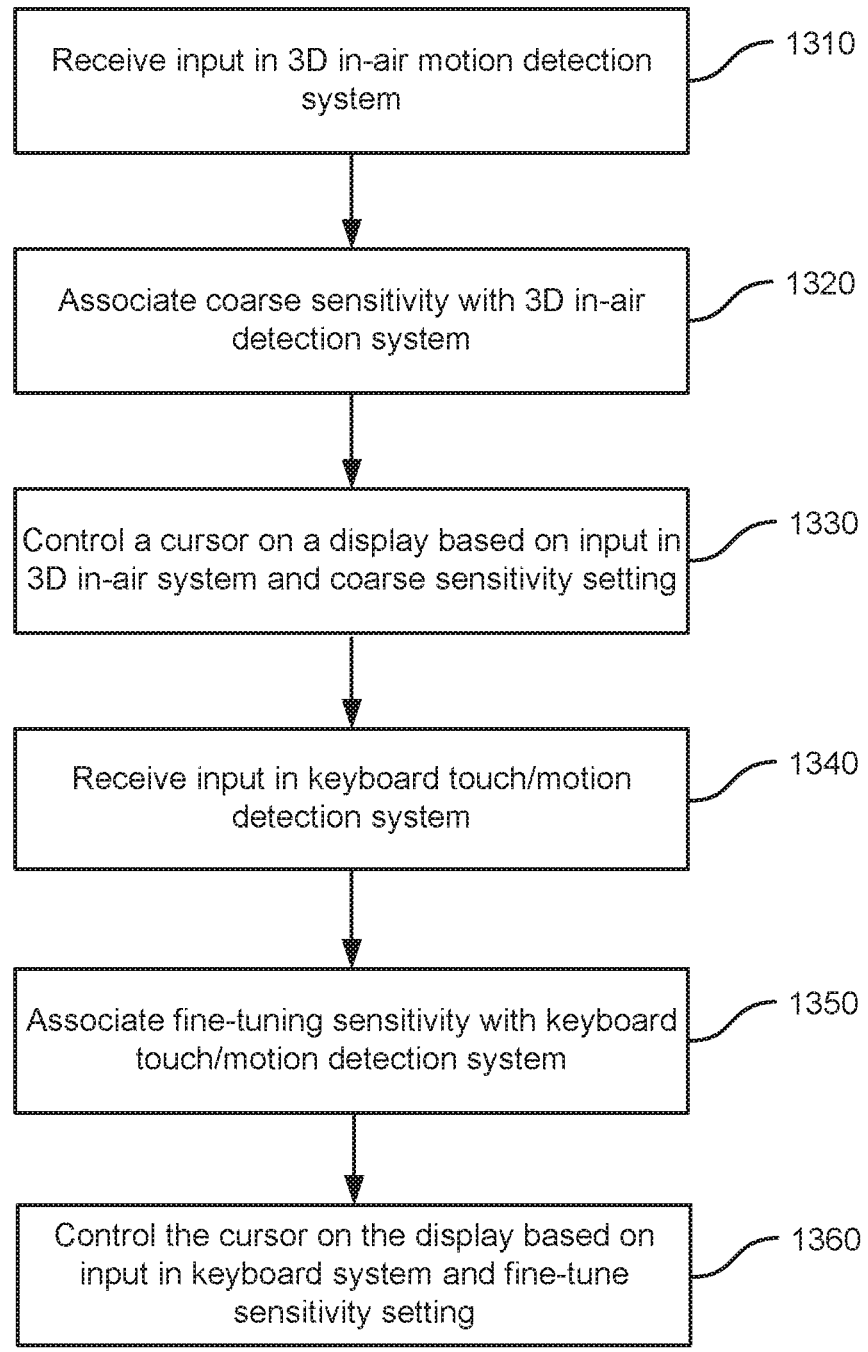
FIG. 13 depicts a simplified flow diagram illustrating aspects of a method for implementing dual simultaneous modes of touch/motion detection, according to certain embodiments of the invention.

FIG. 13 depicts a simplified flow diagram illustrating aspects of a method 1200 for implementing dual simultaneous modes of touch/motion detection, according to certain embodiments of the invention. More specifically, method 1300 provides an example of how a dual mode system utilizing both a 3D in-air detection system and a keyboard-based touch/motion detection system can be used in conjunction with each other. The method 1300 can be performed by processing logic that may comprise hardware (e.g., circuitry, dedicate logic, etc.), software (which as is run on a general purpose computing system or a dedicated machine), firmware (embedded software), or any combination thereof. In some embodiments, method 1300 is performed by the processor 210, keyboard 1000, input device 1050, and monitor 1030.

At step 1310, the dual mode system receives an input in the 3D in-air detection system. The 3D input is associated with a movement having a coarse sensitivity (step 1320). At step 1330, the input controls a cursor or pointer on a display, where the input is based upon both the movement in the 3D input system and its corresponding coarse sensitivity. At 1340, the dual mode system receives an input in the keyboard touch/motion detection system. The keyboard input is associated with a movement having a fine-tuning sensitivity (step 1350). At 1360, the input controls the cursor or pointer on the display, where the input is based upon both the movement in the keyboard system and its corresponding fine-tuned sensitivity.

It should be appreciated that the specific steps illustrated in FIG. 13 provide a particular method for implementing dual simultaneous modes of touch/motion detection, according to an embodiment of the present invention. Other sequences of steps may also be performed according to alternative embodiments. Certain embodiments of method 1300 may perform the individual steps in a different order, at the same time, or any other sequence for a particular application, as noted above. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method.

It should be noted that any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

It is to be understood that the examples and embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. An input device comprising:
   one or more processors;
   a plurality of keys including:
   a controller key; and
   one or more input keys; and
   a first sensor system controlled by the processor and configured to detect a location of an object in three-dimensional (3D) space configured over and not touching a top surface of the one or more input keys while the controller key is activated; and
   a second sensor system controlled by the one or more processors and configured to detect a location of the object touching the top surface of the one or more input keys while the controller key is activated,
   wherein the first sensor system detects at a first sensitivity level, and
   wherein the second sensor system detects at a second sensitivity level different from the first sensitivity level, and
   wherein the first and second sensor systems are each configured to generate a signal corresponding to a position of the object relative to the one or more input keys, the signal configured to control a cursor on a display according to the corresponding sensitivity level.

2. The input device of claim 1 wherein the plurality of keys, when pressed, cause the processor to generate an output.

3. The input device of claim 2 wherein the output corresponds to an alphanumeric output, a directional output, or a functional output.

4. The input device of claim 1 wherein the controller key is one of a shift key, control key, windows key, command key, alt key, or default modifier key for the input device.

5. The input device of claim 1 wherein any of the plurality of keys is user-assignable as the controller key.

6. A method for controlling a keyboard having a controller key and one or more input keys the method comprising:
  receiving, by one or more processors, a control signal indicating that the controller key on the keyboard is activated;
  receiving, by the one or more processors while the controller key is activated, a first input signal from a first sensor system configured to detect a location of an object in 3D space over and not touching a top surface of the input keys;
  receiving, by the one or more processors while the controller key is activated, a second input signal from a second sensor system configured to detect a location of the object touching the top surface of the one or more input keys; and
  controlling a cursor on a display based on the received first and second input signals.

7. The method of claim 6 further comprising determining an input gesture based on a motion signal.

8. The method of claim 6 wherein the controller key is one of a shift key, control key, windows key, command key, alt key, or default modifier key for the keyboard.

9. The method of claim 6 wherein any key of a plurality of keys on the keyboard can be user-assigned as the controller key.

10. A system comprising:
  one or more processors;
  a keyboard having a controller key and a plurality of input keys, the keyboard controlled by the one or more processors;
  a first sensor system controlled by the one or more processors and configured to detect a location of an object in 3D space over a top surface of the plurality of input keys;
  a second sensor system controlled by the one or more processors and configured to detect a location of the object touching the top surface of the plurality of input keys;
  one or more non-transitory computer-readable storage mediums containing instructions configured to cause the processor to perform operations including:
    receiving, from the keyboard, a control signal indicating that the controller key is activated;
    receiving, by the one or more processors while the controller key is activated, a first input signal from a first sensor system corresponding to the detected location of the object in 3D space;
    receiving, by the one or more processors while the controller key is activated, a second input signal from a second sensor system corresponding to the location of the object touching the top surface of the plurality of input keys; and
    controlling a cursor on a display based on the received first and second input signals.

11. The system of claim 10 wherein the computer-readable storage mediums further contain instructions to cause the processor to perform operations including:
  determining an input gesture based on the first input signal.

12. The system of claim 10 wherein the controller key is one of a shift key, control key, windows key, command key, alt key, or default modifier key for the input device keyboard.

13. The system of claim 10 wherein any key of a plurality of keys on the keyboard can be user-assigned as the controller key.

* * * * *